United States Patent
Ito (10) Patent No.: US 9,030,507 B2
(45) Date of Patent: May 12, 2015

(54) ELECTRO-OPTICAL DEVICE AND ELECTRONIC APPARATUS

(75) Inventor: Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 13/344,389

(22) Filed: Jan. 5, 2012

(65) Prior Publication Data

US 2012/0176375 A1 Jul. 12, 2012

(30) Foreign Application Priority Data

Jan. 11, 2011 (JP) ................................ 2011-003057

(51) Int. Cl.
| | |
|---|---|
| G06T 15/00 | (2011.01) |
| G02B 27/22 | (2006.01) |
| G09G 3/00 | (2006.01) |
| H04N 13/04 | (2006.01) |
| G09G 3/36 | (2006.01) |
| H04N 13/00 | (2006.01) |

(52) U.S. Cl.
CPC ........ G02B 27/2242 (2013.01); G02B 27/2264 (2013.01); G09G 3/003 (2013.01); G09G 3/3611 (2013.01); H04N 13/0018 (2013.01); H04N 13/0438 (2013.01); H04N 13/0497 (2013.01); G09G 2310/0205 (2013.01)

(58) Field of Classification Search
CPC ........... G02B 27/2242; G02B 27/2264; G09G 3/003; G09G 3/3611; G09G 2310/0205; H04N 13/0438; H04N 13/0018; H04N 13/0497
USPC ......................................... 345/690–694, 419
See application file for complete search history.

(56) References Cited

U.S. PATENT DOCUMENTS

| | | | | |
|---|---|---|---|---|
| 2004/0041760 A1* | 3/2004 | Tsumura et al. | ................. | 345/87 |
| 2010/0231697 A1 | 9/2010 | Nakahata et al. | | |
| 2010/0295837 A1* | 11/2010 | Yoshinaga et al. | ............. | 345/211 |
| 2011/0007140 A1* | 1/2011 | Nakahata et al. | ............... | 348/56 |
| 2011/0018859 A1 | 1/2011 | Ito | | |

FOREIGN PATENT DOCUMENTS

| | | | |
|---|---|---|---|
| JP | 2009-025436 A | | 2/2009 |
| JP | 2009025436 A | * | 2/2009 |
| JP | 2010-107580 A | | 5/2010 |
| JP | 2010-217310 A | | 9/2010 |
| JP | 2010-224547 A | | 10/2010 |
| JP | 2010-271366 A | | 12/2010 |
| JP | 2011-027810 A | | 2/2011 |

* cited by examiner

*Primary Examiner* — Amare Mengistu
*Assistant Examiner* — Jennifer Zubajlo
(74) *Attorney, Agent, or Firm* — Maschoff Brennan (57) ABSTRACT

A plurality of pixel circuits include liquid crystal elements which are arranged corresponding to each intersection of a plurality of scanning lines and a plurality of signal lines, and display a gradation corresponding to a gradation signal of the signal line at the time of selecting the scanning line. A driving circuit sequentially selects the plurality of scanning lines as a selection unit in a first writing period of a right eye period, supplies a gradation signal corresponding to a specified gradation of a right eye image which corresponds to a specified scanning line in the selection unit to each pixel circuit, and sequentially selects a scanning line other than the specified scanning line, and supplies a gradation signal which corresponds to the specified gradation corresponding to the specified gradation to each pixel circuit, in a second writing period.

10 Claims, 7 Drawing Sheets

PRIOR ART

ELECTRO-OPTICAL DEVICE AND ELECTRONIC APPARATUS

BACKGROUND

1. Technical Field

The present invention relates to a technology which displays a right eye image and left eye image to which a relative parallax is applied, in order to make a viewer sense a stereoscopic effect.

2. Related Art

In the related art, a stereoscopic method of a frame sequential method in which the right eye image and left eye image are alternately displayed in a time division manner has been proposed. Since the right eye image and left eye image are mixed in the period when one of the right eye image and left eye image is changed to the other, it may be difficult for the viewer to sense the stereoscopic effect clearly when viewing the stereoscopic image (cross talk). For example, a technology is disclosed in JP-A-2009-25436, in which a viewer is not allowed to view an image by making both a right eye shutter and left eye shutter be shut in the period when one of the right eye image and left eye image is changed to the other (that is, a time period in which the right eye image and left eye image are mixed).

Figure 10:
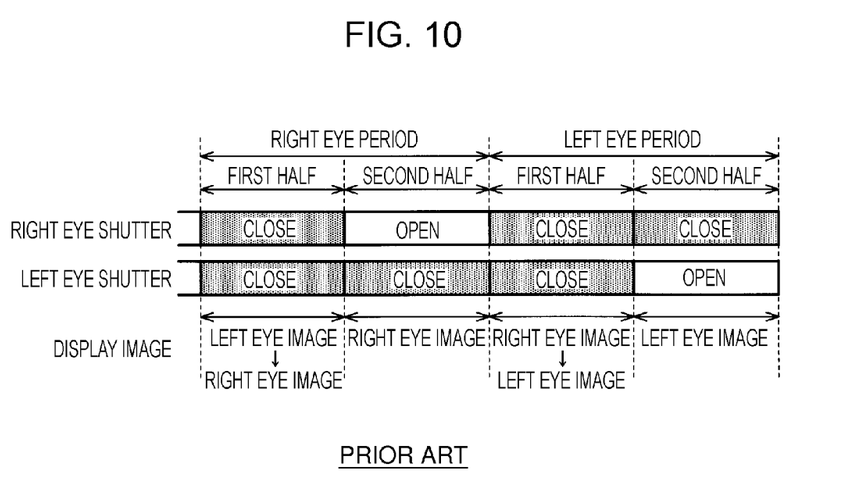
FIG. 10 is an explanatory diagram of a stereoscopic operation in the related art.

In detail, as shown in FIG. 10, a right eye period which corresponds to the right eye image and a left eye period which corresponds to the left eye image are alternately set. In the first half of the right eye period, a display image is updated to the right eye image from the left eye image, and the right eye image is displayed in the second half. In the first half of the left eye period, the display image is updated to the left eye image from the right eye image, and the left eye image is displayed in the second half period. In each of the first half of the right eye period and left eye period, both of the right eye shutter and left eye shutter are controlled to be in a closed state. Accordingly, the mixed state of the right eye image and left eye image (cross talk) is not sensed by the viewer.

SUMMARY

However, according to the technology which is disclosed in JP-A-2009-25436, a period in which a user can view the image in practice is limited to the second half period (that is, approximately half) in each of the right eye period and left eye period. Accordingly, there is a problem in that it is not easy to secure sufficient brightness of the display image. An advantage of some aspects of the invention is to improve the brightness of the display image while preventing the user from sensing the mixed state of the right eye image and left eye image.

According to an aspect of the invention, there is provided an electro-optical device which includes, a plurality of scanning lines and signal lines which intersect each other; a scanning line driving circuit which sequentially selects a plurality of scanning lines for each selection period as a selection unit in each of a first writing period of a plurality of unit periods which are respectively included in a right eye period and left eye period which are alternately set, and sequentially selects scanning lines among each of the selection units other than the specified scanning line which is selected in the immediately previous first writing period in a second writing period after the first writing period among each of unit periods of the respective right eye period and left eye period; and a signal line driving circuit which supplies a gradation signal to each signal line, which designates a pixel selected by the specified scanning line in a selection unit in the selection period among the right eye image to have a specified gradation, for each selection period in each of the first writing periods of the right eye period, and supplies a gradation signal to each signal line, which designates a pixel selected by the scanning line selected in the selection period among the right eye images to have the specified gradation for each of selection period in each of the second writing periods in the right eye period, on the other hand, the signal line driving circuit supplies a gradation signal to each signal line, which designates a pixel selected by the specified scanning line in a selection unit in the selection period among the left eye image to have the specified gradation, for each selection period in each of the first writing periods of the left eye period, and supplies a gradation signal to each signal line, which designates a pixel which is selected by the scanning line selected in the selection period among the left eye images to have the specified gradation for each of selection period in each of the second writing periods in the left eye period.

In the above described configuration, since a plurality of scanning lines (selection unit) are sequentially selected, and the gradation signal is supplied to each pixel circuit in each of the first writing periods of the respective right eye period and left eye period, the period in which the right eye image and left eye image are mixed may be shortened compared to a configuration in which a unit of one scanning line is sequentially selected at the initial right eye and left eye periods, and the gradation signal is provided to each of the pixel circuits. Accordingly, it is possible to improve the brightness of the display image even in a case where the user is prevented from sensing the mixed state of the right eye image and left eye image by controlling both the right eye shutter and left eye shutter of the stereoscopic glasses to be in a closed state in the period in which the right eye image and left eye image are mixed. In addition, the resolution of the display image is lowered in the first writing period, however, since the gradation signal is provided to each of the pixel circuits corresponding to the scanning line other than the specified scanning line in the second writing period immediately after the first writing period, it is possible to make the lowered resolution of the display image difficult for the viewer to sense.

According to the aspect of the invention, an electro-optical device which displays the right eye image and left eye image which are stereoscopically viewed using stereoscopic glasses which include the right eye shutter and left eye shutter may include a glasses control circuit which allows the left eye shutter to be a closed state in the right eye period, and changes a closed state of the right eye shutter to an open state at a time point in which a predetermined time has passed from the starting point in the beginning of the first writing period among the right eye periods. According to the above described aspect, it is possible to prevent the user from sensing the mixed state of the right eye image and left eye image in a time period in which a predetermined time passes from the starting point in the beginning of the first writing period, in each of the right eye period and left eye period. According to a configuration in which the closed state of the right eye shutter is changed to the open state at the ending point of the first period in the initial stage among the right eye periods, and the closed state of the left eye shutter is changed to the open state at the ending point of the first period in the initial stage among the left eye periods, the effect which makes the mixed state of the right eye image and left eye image difficult for the viewer to sense is very prominent.

According to the aspect of the invention, the signal line driving circuit may supply the gradation signal to each signal line so that an applied voltage of an electro-optical element has a reverse polarity in each unit period neighboring each other, in each of the right eye period and left eye period. According to the above described aspect, since the applied voltage of the electro-optical element is reversed, it is advantageous that the characteristic deterioration of the electro-optical element (typically a liquid crystal element) due to the application of DC component can be prevented. Particularly in the above described configuration, since the applying voltage of the electro-optical element is reversed for each unit time in each of the right eye period and the left eye period, there is an advantage in that it is possible to effectively prevent the application of DC component with respect to the electro-optical element, in comparison to a configuration in which the applying voltage of the electro-optical element has the reverse polarity in the right eye period and the left eye period, for example. According to a configuration in which each of the right eye period and the left eye period includes an even number of unit periods, the effect which prevents the application of the DC component with respect to the electro-optical element is very prominent, since the time length in which the positive voltage is applied to the electro-optical element and the time length in which the negative voltage is applied to the electro-optical element in each of the right eye period and left eye period are equalized.

According to the aspect, the scanning line driving circuit changes a combination of a plurality of scanning lines which are selected as selection units in each of the first writing periods of the right eye period and left eye period for each the first writing period in each unit period. According to the above described aspect, it is advantageous that display spots are reduced due to a difference of the supply numbers or the supply intervals of the gradation signal, since a pixel circuit to which the gradation signal is supplied in the first writing period and the gradation signal is not supplied in the second writing period, and a pixel circuit to which the gradation signal is supplied in both the first and second writing periods are changed in each of the first writing periods. For example, the scanning line driving circuit selects a selection unit in each of the first writing periods so that a combination of a plurality of scanning lines which are selected as the selection units in the first writing period of one unit period and a combination of a plurality of scanning lines which are selected as the selection units in the first writing period of the other unit period are in a relationship of being deviated by one row, in each of the right eye period and left eye period.

The electro-optical device according to each of the above described aspects is adopted in various electronic apparatuses as a display body. For example, a stereoscopic display device which includes the electro-optical device according to each of the above described aspects and stereoscopic glasses controlled by the glasses control circuit are exemplified as an electronic apparatus of the aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

A: First Embodiment

Figure 1:
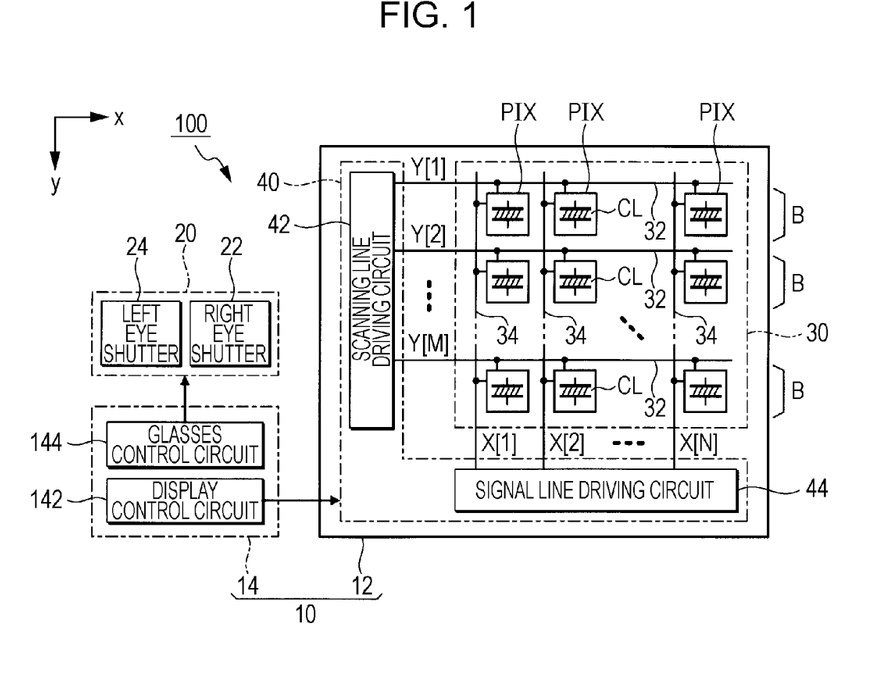
FIG. 1 is a block diagram of a stereoscopic display device according to a first aspect of the invention.

FIG. 1 is a block diagram of a stereoscopic display device 100 according to a first embodiment of the invention. The stereoscopic display device 100 is an electronic apparatus which displays a stereoscopic image which allows a viewer to sense a stereoscopic effect using an active-shutter system, and includes an electro-optical device 10 and stereoscopic glasses 20. The electro-optical device 10 alternately displays the right eye image GR and the left eye image GL in a time division manner.

The stereoscopic glasses 20 are glasses-type equipment worn by the viewer when viewing the stereoscopic image displayed using the electro-optical device 10. The stereoscopic glasses 20 include a right eye shutter 22 which is positioned at the front side of the right eye of the viewer and a left eye shutter 24 which is positioned at the front side of the left eye of the viewer. Each of the right eye shutter 22 and the left eye shutter 24 is controlled to be an open state (transmission state) in which irradiation light is transmitted and a closed state (dark state) in which the irradiation light is blocked. For example, a liquid crystal shutter in which the open state and the closed state are changed to each other by changing the orientation direction of the liquid crystal according to the application voltage may be adopted as the right eye shutter 22 and the left eye shutter 24.

The electro-optical device 10 in FIG. 1 includes an electro-optical panel 12 and a control circuit 14. The electro-optical panel 12 includes a pixel unit 30 in which a plurality of pixel circuits (pixel) PIX are arranged, and a driving circuit 40 which drives each pixel circuit PIX. In the pixel unit 30, M scanning lines 32 which extend in the x direction, and N signal lines 34 which extend in the y direction and intersect the x direction are formed (M and N are natural numbers). The plurality of pixel circuits PIX in the pixel unit 30 are arranged in a matrix shape of vertical M rows×horizontal N columns, corresponding to each intersection of the scanning line 32 and the signal line 34. That is, M rows of a group of the N pixel circuits PIX (hereinafter referred to as a pixel circuit group) B which is arranged in the x direction are arranged in parallel in the y direction.

The driving circuit 40 includes a scanning line driving circuit 42 and a signal line driving circuit 44. The scanning line driving circuit 42 sequentially selects each scanning line 32 (each pixel circuit group B) by being supplied with scanning signals Y(1) to Y(M) which correspond to each scanning line 32. When a scanning signal Y(m)(m=1 to M) is set to a selection potential, a scanning line 32 of mth row is selected. The signal line driving circuit 44 supplies gradation signals X(1) to X(N) to each of N signal lines 34 in synchronization with the selection of a signal line 32 by the scanning line driving circuit 42. The gradation signals X(n)(n=1 to N) are voltage signals in which the potential VG is variably set according to specified gradation (each pixel value of the display image) in an image signal which is supplied from an external circuit, and the polarity thereof with respect to a predetermined reference potential periodically reverses.

Figure 2:
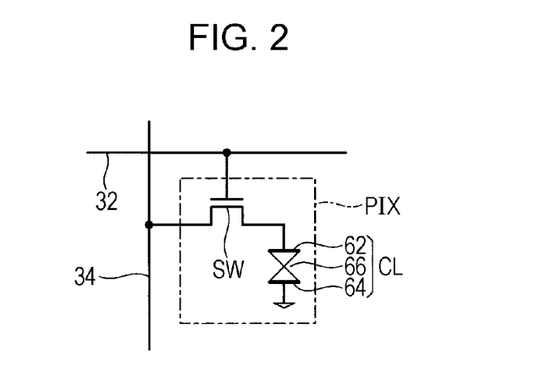
FIG. 2 is a circuit diagram of a pixel circuit.

FIG. 2 is a circuit diagram of each pixel circuit PIX. As shown in FIG. 2, each pixel circuit PIX includes a liquid crystal element CL and a selection switch SW. The liquid crystal element CL is an electro-optical element which is formed of a pixel electrode 62 and common electrode 64 which face each other and a liquid crystal 66 which is interposed therebetween. Transmittance (display gradation) of a liquid crystal 66 changes according to the application voltage between the pixel electrode 62 and the common electrode 64. The selection switch SW is formed of a thin film transistor of an N-channel-type in which gate is connected to the scanning line 32, and controls the electric connection (conduction or insulation) between the liquid crystal element CL and the signal line 34 by being interposed therebetween. When the scanning line Y(m) is set to a selection potential, the selection switch SW is transited to an on-state at the same time, in each of the pixel circuits PIX of the mth row. Each of the pixel circuits PIX (liquid crystal element CL) displays a gradation corresponding to the potential VG of the gradation signal X(n) when the selection switch SW is turned on (that is, when selecting the scanning line 32). In addition, a configuration may be adopted in which an auxiliary capacity is connected in parallel to the liquid crystal element CL.

The control circuit 14 in FIG. 1 includes a display control circuit 142 which controls the electro-optical panel 12, and a glasses control circuit 144 which controls the stereoscopic glasses 20. In addition, the display control circuit 142 and the glasses control circuit 144 may be mounted in a single integrated circuit. Alternatively, the display control circuit 142 and the glasses control circuit 144 may be configured by being mounted in a separate integrated circuit. The display control circuit 142 controls the driving circuit 40 so that a right eye image GR and a left eye image GL which are given with parallax each other are displayed in the pixel unit 30 in a time division manner. In detail, the display control circuit 142 controls the driving circuit 40 so that the driving circuit 40 can execute the following operations.

Figure 3:
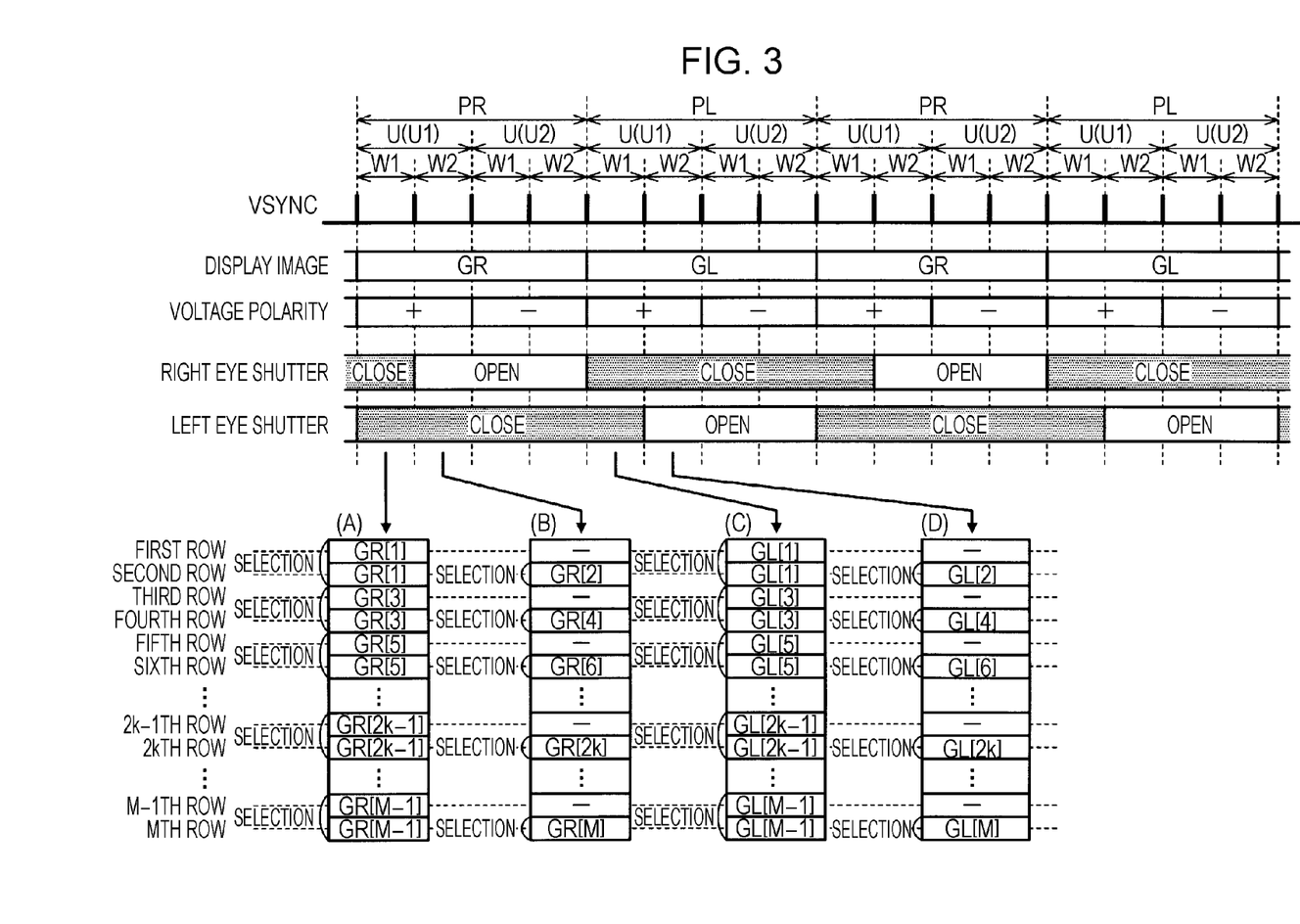
FIG. 3 is an explanatory diagram of a stereoscopic display device.

FIG. 3 is an explanatory diagram which shows an operation of the electro-optical device 10. An operation period of the electro-optical device 10 is divided into a right eye period PR for displaying the right eye image GR and left eye period PL for displaying the left eye image GL. Each of the right eye periods PR and each of the left eye periods PL is alternately arranged on a time axis. Each of the right eye periods PR and left eye periods PL includes a plurality of unit time periods U (even numbers). According to the first embodiment, a case is assumed in which each of the right eye periods PR and left eye periods PL includes two unit periods U (U1 and U2). Each unit period U is divided into a first writing period W1 and a second writing period W2. The second writing period W2 is subsequent to the first writing period W1. As shown in FIG. 3, each of the first writing period W1 and second writing period W2 is defined as one period of the vertical synchronization signal V SYNC which is supplied to the scanning line driving circuit 42 and the signal line driving circuit 44 from the display control circuit 142.

Figure 4:
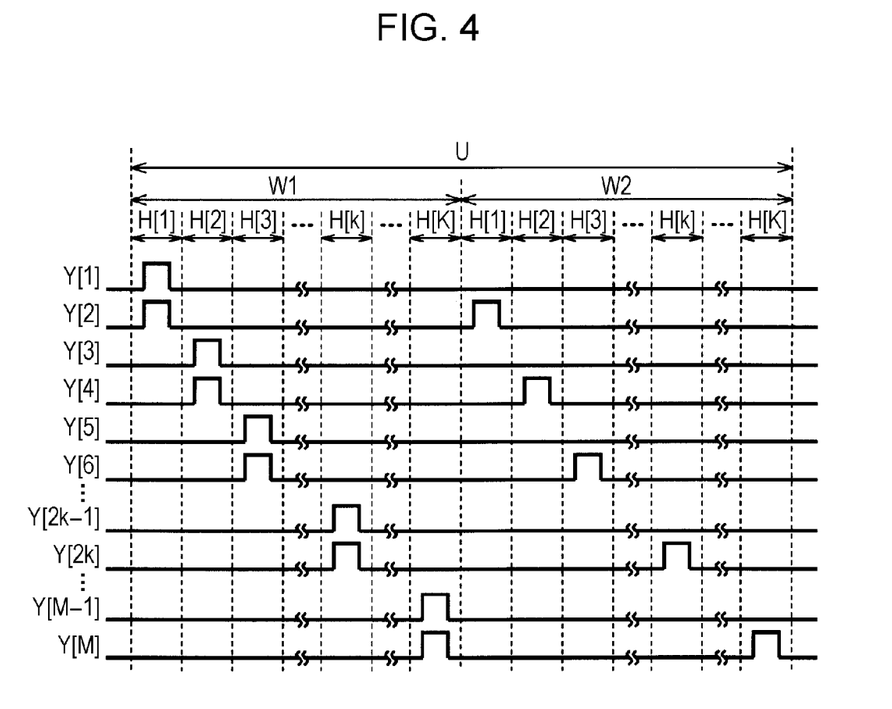
FIG. 4 is an explanatory diagram of a scanning line driving circuit.

FIG. 4 is an explanatory diagram which shows an operation of the scanning line driving circuit 42 in each of unit period U (U1 and U2) in each of the right eye periods PR and left eye periods PL. As shown in FIG. 4, the scanning line driving circuit 42 sequentially selects two scanning lines 32 (two lines of the pixel circuit group B) neighboring each other as a selection unit, in the selection period H(1) to H(K), in the first writing period W1 of each the unit period U. That is, in the selection period H(K) of kth (k=1 to K) of each first writing period W1, a scanning signal Y(2k−1) of the odd numbered rows and a scanning signal Y(2k) of the even numbered rows are set as the selection potential at the same time, accordingly, a scanning line 32 of (2k−1)th row (a pixel group B of the odd numbered rows) and a scanning line 32 of 2kth row (a pixel group B of the even numbered rows) are selected at the same time. For example, in the selection period H(1), the scanning lines 32 in the first and second rows are selected at the same time, and the scanning lines 32 in the third and fourth rows are selected at the same time in the selection period H(2). Accordingly, the total number K of the selection period H(k) in the first writing period W1 corresponds to a half of the total number (the number of rows of the pixel circuit group B) M (K=M/2) of the scanning line 32. Hereinafter, one scanning line 32 (a scanning line of the (2k−1)th row in the first embodiment) among the selection units (two scanning lines 32) which are simultaneously selected in each selection period H(k) is denoted as "a specified scanning line 32".

On the other hand, in the second writing period W2 of each unit period U in each of the right eye periods PR and left eye periods PL, the scanning line driving circuit sequentially selects a plurality of scanning lines 32 (M/2 lines) other than the specified scanning line 32 line by line, among each of the selection units which are selected in the immediately previous first writing period W1, in the selection periods H(1) to H(k). That is, in the kth selection period H(k) in the second writing period W2, the scanning signal Y(2k) is set as the selection potential, thereby selecting one scanning line 32 of the 2kth row (a pixel circuit group B of the 2kth row). For example, in the selection period H(1), the scanning line 32 of the second row is selected, and the scanning line 32 of the fourth row is selected in the selection period H(2). Accordingly, in each of the second writing periods W2, K selection periods H(1) to H(k) are included, similarly to the first writing period W1.

As shown in FIG. 3, the signal line driving circuit supplies the gradation signal X(1) to X(N) of the potential VG corresponding to the specified gradation (pixel value) of each pixel of the right eye image GR, to each signal line 34 for each selection period H(k) in the right eye periods PR, and supplies the gradation signal X(1) to X(N) of the potential VG corresponding to the specified gradation of each pixel of the left eye image GL, to each signal line 34 for each selection period H(k) in the left eye periods PL. As shown in FIG. 3, in each of the right eye periods PR and left eye periods PL, the polarity of the potential VG of each gradation signal X(n) is sequentially reversed for each unit period U so that the application voltage of the liquid crystal element CL of each pixel circuit PIX has a reverse polarity in the unit period U. In detail, the potential VG of the gradation signal X(n) is set to a positive polarity (+) with respect to the reference potential (for example, the potential of the common electrode 64) in each the unit period U1 of the right eye periods PR and left eye periods PL, and is set to a negative polarity (−) with respect to the reference potential in the unit period U2.

In the selection period H(k) in which the scanning line 32 of the (2k−1)th row among the first writing periods W1 of each unit period U (U1 and U2) of the right eye periods PR and the scanning line 32 of the 2kth row are selected at the same time, the signal line driving circuit supplies the gradation signal X(n) of a potential VG corresponding to the specified gradation of each pixel which corresponds to the specified scanning line 32 (that is, the scanning line 32 of the (2k−1)th row) among the right eye images GR, to each of the signal lines 34. That is, as shown in the reference numeral (A)

in FIG. 3, in the selection period H(k) of the first writing period W1, a potential VG corresponding to the specified gradation GR (2k−1) of each pixel of the (2k−1)th row among the right eye images GR is supplied with respect to each of the pixel circuit PIX of the (2k−1)th row and 2kth row. In the selection period H(1), a potential VG corresponding to the specified gradation GR(1) of each pixel of the first row among the right eye images GR is supplied to each pixel circuit PIX of the first and second rows. In the selection period H(2), a potential VG corresponding to the specified gradation GR(3) of each pixel of the third row among the right eye images GR is supplied to each pixel circuit PIX of the third and fourth rows. As described above, since the potential VG equal to each other is supplied to each pixel circuit PIX neighboring each other in the Y direction, the right eye image GR of which the resolution in the Y direction is reduced to half is displayed on the pixel unit 30, when the first writing period W1 is ended.

As shown in the reference numeral (C) in FIG. 3, the gradation signal X(n) of the potential VG corresponding to the specified gradation GL (2k−1) of each pixel of the (2k−1)th row among the left eye image GL is supplied to each pixel circuit PIX of the (2k−1)th row and the 2kth row, in the first writing period W1 of each unit period U of the left eye periods PL, as well. That is, for example, in the selection period H(1), the potential VG corresponding to the specified gradation GL(1) of each pixel of the first row among the left eye images GL is supplied to each pixel circuit PIX of the first and second rows, and the potential VG corresponding to the specified gradation GL(3) of each pixel of the third row among the left eye images GL is supplied to each pixel circuit PIX of the third and fourth rows, in the selection period H(2). As described above, in each of the first writing periods W1 of the right eye periods PR and left eye periods PL, the supply (write) of the potential voltage VG of each pixel circuit PIX is sequentially performed by two rows of the pixel circuit group B for each selection period H(k) (that is, for each selection unit).

On the other hand, in the selection period H(k) in which the scanning line 32 of the 2kth row among the second writing period W2 of each unit period U (U1 and U2) of the right eye period PR is selected, as shown in the reference numeral (B) in FIG. 3, the signal line driving circuit 44 supplies the gradation signal X(n) of the potential VG corresponding to the specified gradation GR(2k) of each pixel of the 2kth row which corresponds to the scanning line 32 among the right eye images GR (that is, the scanning line other than the specified scanning line 32 among the selection unit), to each of the signal lines 34. In detail, in the selection period H(1), the gradation signal X(n) of the potential VG corresponding to specified gradation GR(2) of each pixel of the second row among the right eye images GR is supplied to each pixel circuit PIX of the second row, and in the selection period H(2), the gradation signal X(n) of the potential VG corresponding to the specified gradation GR(4) of each pixel of the fourth row among the right eye images GR is supplied to each pixel circuit PIX of the fourth row. On the other hand, the application voltage of the liquid crystal element CL of each pixel circuit PIX corresponding to the odd numbered rows (that is, the specified scanning line 32 in each of the selection units) is maintained at the application voltage in the immediately previous first writing period W1. Accordingly, the right eye image GR which was displayed with half the resolution in the Y direction at the ending point of the first writing period W1 is updated to a right eye image GR with an expected resolution (M rows×N columns) at the ending point of the second writing period W2.

As shown in the reference numeral (D) in FIG. 3, in the selection period H(k) which is selected by the scanning line 32 of the 2kth row, the gradation signal X(n) of the potential VG corresponding to the specified gradation GL(2k) of each pixel of the 2kth row which corresponds to the scanning line 32 among the left eye images GL is supplied to each of the signal lines 34, in the second writing period W2 of each unit period U of the left eye periods PL, as well. For example, in the selection period H(1), the gradation signal X(n) of the potential VG corresponding to the specified gradation GL(2) of each pixel of the second row among the left eye images GL is supplied to each pixel circuit PIX of the second row. In the selection period H(2), the gradation signal X(n) of the potential VG corresponding to the specified gradation GL(4) of each pixel of the fourth row among the left eye images GL is supplied to each pixel circuit PIX of the fourth row. As described above, in each of the second writing periods W2 of the right eye periods PR and left eye periods PL, the supply (write) of the potential VG is sequentially performed for each selection period H(k), with respect to each of the pixel circuits PIX corresponding to the scanning line 32 other than the specified scanning line 32 (that is, each pixel circuit PIX which is selected every other row) among each selection units in the first writing period W1.

In the first writing period W1 of the initial stage in the right eye periods PR, the left eye image GL which is displayed in the left eye period PL (the second writing period W2 in the unit period U2) in the immediately previous left eye period PL is changed to the right eye image GR for every two rows in each of the selection periods H(k). In the first writing period W1 of the initial stage in the left eye periods PL, the right eye image GR which is displayed in the right eye period PR in the immediately previous right eye period PR is changed to the left eye image GL for every two rows in each of the selection periods H(k). That is, in the first writing period W1 of the initial stage in the right eye periods PR and the left eye period PL, the right eye image GR and the left eye image GL are mixed.

The glasses control circuit 144 of the control circuit 14 controls each state (closed state/open state) of the right eye shutter 22 and the left eye shutter 24 of the stereoscopic glasses 20 in synchronization with the operation of the electro-optical panel 12. That is, as shown in FIG. 3, the glasses control circuit 144 changes the right eye shutter 22 from the closed state to the open state at a time point where a predetermined time has passed from the starting point of the initial first writing period W1 of the right eye period PR, and maintains the closed state of the entire left eye period PL, after changing the right eye shutter 22 from the open state to the closed state at the starting point of the left eye period PL. In detail, the right eye shutter 22 transits from the closed state to the open state at the ending point of the initial first writing period W1 of the right eye period PR. Similarly, the glasses control circuit 144 changes the left eye shutter 24 from the closed state to the open state at a time point where a predetermined time has passed from the starting point of the initial first writing period W1 of the left eye period PL, and maintains the closed state of the entire right eye period PR, after changing the left eye shutter 24 from the open state to the closed state at the starting point of the right eye period PR. In detail, the left eye shutter 24 transits from the closed state to the open state at the ending point of the initial first writing period W1 of the left eye period PL.

Accordingly, the right eye image GR which is displayed in the second writing period W2 in the unit period U1 among the right eye periods PR and the immediately subsequent unit period U2 passes through the right eye shutter 22, reaches the right eye of the viewer, and is blocked by the left eye shutter 24. On the other hand, the left eye image GL which is displayed in the second writing period W2 in the unit period U1 among the left eye periods PL and the subsequent unit period U2 passes through the left eye shutter 24, reaches the left eye of the viewer, and is blocked by the right eye shutter 22. The viewer can sense the stereoscopic effect on the display image when the right eye image GR which has penetrated the right eye shutter 22 is viewed through the right eye, and when the left eye image GL which has penetrated the left eye shutter 24 is viewed through the left eye.

As shown in FIG. 3, in the initial first writing period W1 of the right eye period PR and left eye period PL, both the right eye shutter 22 and the left eye shutter 24 are caused to be in a closed state. As described above, in the initial first writing period W1, the display image is changed between the right eye image GR and the left eye image GL for every two rows, however, since both the right eye shutter 22 and left eye shutter 24 are maintained to the closed state, the mixed state (cross talk) of the right eye image GR and the left eye image GL is not sensed by the viewer. That is, since the right eye image GR and the left eye image GL are reliably separated to the right eye and the left eye, it is possible to make the viewer sense the stereoscopic effect clearly.

In the above described embodiment, in each of the first writing period W1, the pixel circuit group B is selected in a unit of two rows, and the gradation signal X(n) (potential VG) is supplied to each of the pixel circuits PIX. Accordingly, when compared to a configuration in which the pixel circuit group B is sequentially selected in a unit of one row and the gradation signal X(n) is supplied, in the initial stage of the right eye period PR and the left eye period PL, the time length of a period in which the right eye image GR and left eye image GL are mixed (that is, a period in which both the right eye shutter 22 and left eye shutter 24 are to be maintained to the closed state) is shortened. That is, the time length in which any one of the right eye shutter 22 and the left eye shutter 24 is maintained to the open state is sufficiently secured. Accordingly, it is possible to improve the brightness of the display image which is recognized by the viewer. In addition, the resolution in the Y direction of the display image is lowered in the first writing period W1, however, since the gradation signal X(n) is supplied to each of the pixel circuits PIX which corresponds to the scanning line 32 other than the specified scanning line 32, in the immediately subsequent second writing period W2, the lowered resolution of the display image is hardly sensed by the viewer.

In addition, in the first embodiment of the invention, each of the right eye period PR and left eye period PL include a plurality of unit periods U, and the polarity of the application voltage of the liquid crystal element CL is reversed in each unit period U neighboring each other. That is, for example, it is advantageous that the characteristic deterioration of the liquid crystal element CL due to the application of the DC component can be effectively prevented, since the reversing period of the polarity of the application voltage of the liquid crystal element CL is shortened, compared to a case where the polarity of the application voltage of the liquid crystal element CL is reversed in the right eye period PR and left eye period PL.

In addition, since the specified gradation of each pixel is different in the right eye image GR and left eye image GL, in a configuration in which the polarity of the application voltage of the liquid crystal element CL is reversed in the right eye period PR and left eye period PL, it is not easy to suppress the application of the DC component with respect to the liquid crystal element CL, for example, because there is a big difference between the positive polarity which is applied to the liquid crystal element CL in the right eye period PR and the negative polarity which is applied to the liquid crystal element CL in the left eye period PL. On the other hand, in the first embodiment, the polarity of the application voltage of the liquid crystal element CL is reversed for each unit period U in the right eye period PR in which the right eye image GR is displayed, and the polarity of the application voltage of the liquid crystal element CL is reversed for each unit period U in the left eye period PL in which the left eye image GL is displayed. Accordingly, it is advantageous that the inclination (remaining of the DC component) of the polarity of the application voltage is effectively suppressed, in regardless of the difference between the right eye image GR and left eye image GL. Specially, in the above described example, since each of the right eye period PR and left eye period PL includes even numbers of unit periods U, the time length in which the positive voltage is applied and the time length in which the negative voltage is applied, to the liquid crystal element CL of each pixel circuit PIX are equalized, in each of the right eye period PR and left eye period PL. Accordingly, the effect of suppressing the inclination of the polarity of the application voltage of the liquid crystal element CL is very prominent.

B: Second Embodiment

The second embodiment of the invention will be described in below. In addition, in each embodiment which is exemplified in below, elements of which operations and functions are the same as those of the first embodiment will be given the same reference numerals and detailed descriptions thereof will be appropriately omitted.

Figure 5:
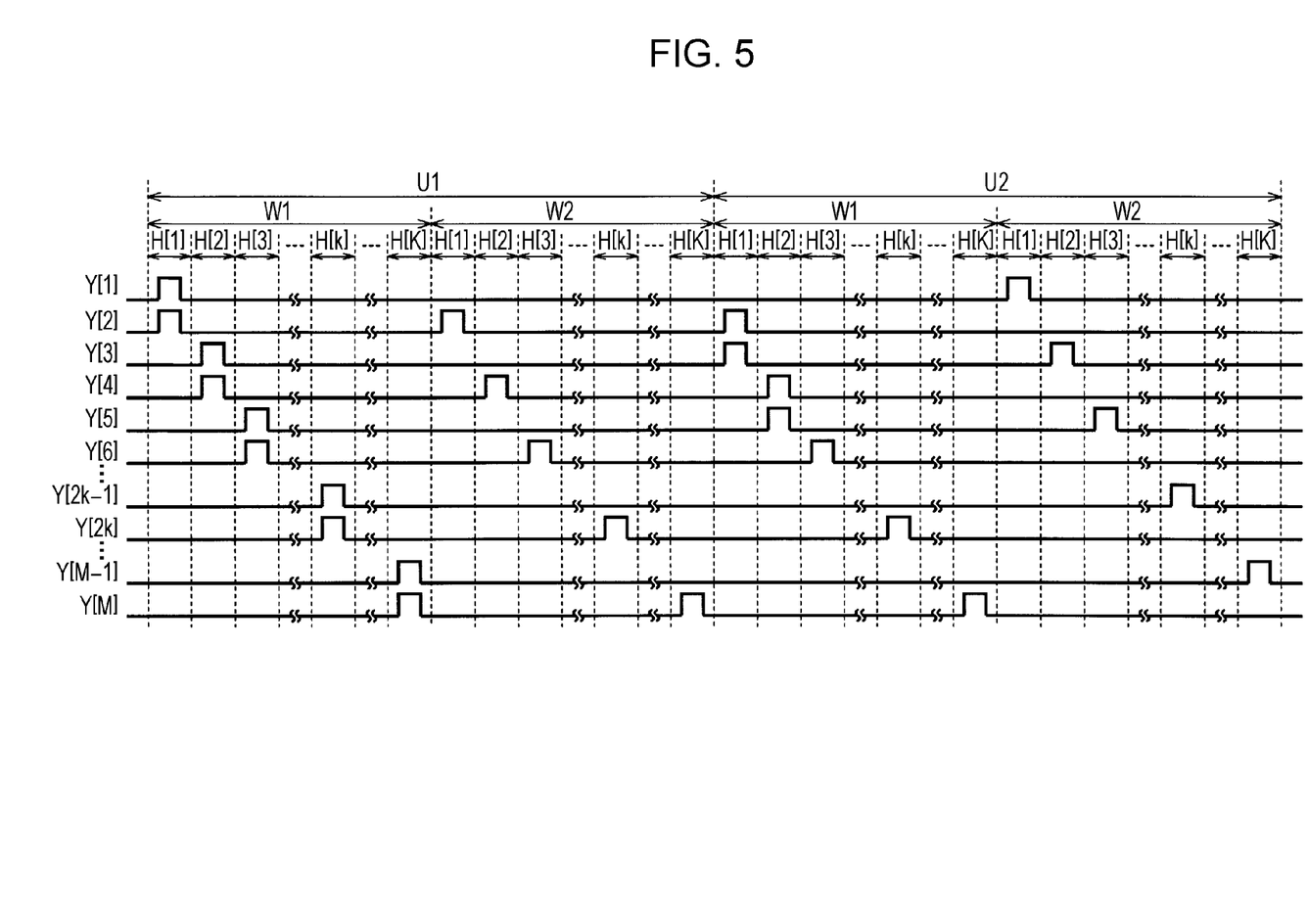
FIG. 5 is an explanatory diagram of an operation of the scanning line driving circuit according to a second aspect of the invention.

FIG. 5 is an explanatory diagram of an operation of a scanning line driving circuit 42 according to the second embodiment of the invention. In the first embodiment, the combination of a plurality of the scanning lines 32 (selection unit), which is simultaneously selected in each of the selection periods H(k) of the first writing period W1 was allowed to be common between the unit period U1 and the unit period U2. In the second embodiment, the combination of a plurality of the scanning lines 32, which is selected in the first writing period W1 is different between the unit period U1 and the unit period U2.

In detail, in the first writing period W1 of the unit period U1 in each of the right eye period PR and left eye period PL, the scanning line driving circuit 42 sequentially selects a combination of a scanning line 32 of (2k−1)th row and a scanning line 32 of 2kth row as a selection unit for each selection period H(k), similarly to the first embodiment. That is, as shown in the reference numeral (A) in FIG. 6, for example, in a selection period H(1), a scanning line 32 of a first row and a scanning line of a second row are simultaneously selected, and in a selection period H(2), a scanning line 32 of a third row and a scanning line 32 of a fourth row are simultaneously selected. In addition, in each selection period H(k) in a first writing period W1, a potential voltage VG corresponding to a specified gradation (GR(2k−1) and GL(2k−1)) of each pixel which corresponds to a scanning line 32 (specified scanning line 32) of a (2k−1)th row between the right eye image GR or the left eye image GL is supplied to each pixel circuit PIX of the selection unit. In addition, as shown in the reference numeral (B) in FIG. 6, a gradation signal X(n) of the potential VG is supplied to each of the pixel circuits PIX which corresponds to a scanning line 32 other than the specified scanning line 32 among the selection unit, in the immediately subsequent second writing period W2.

Figure 6:
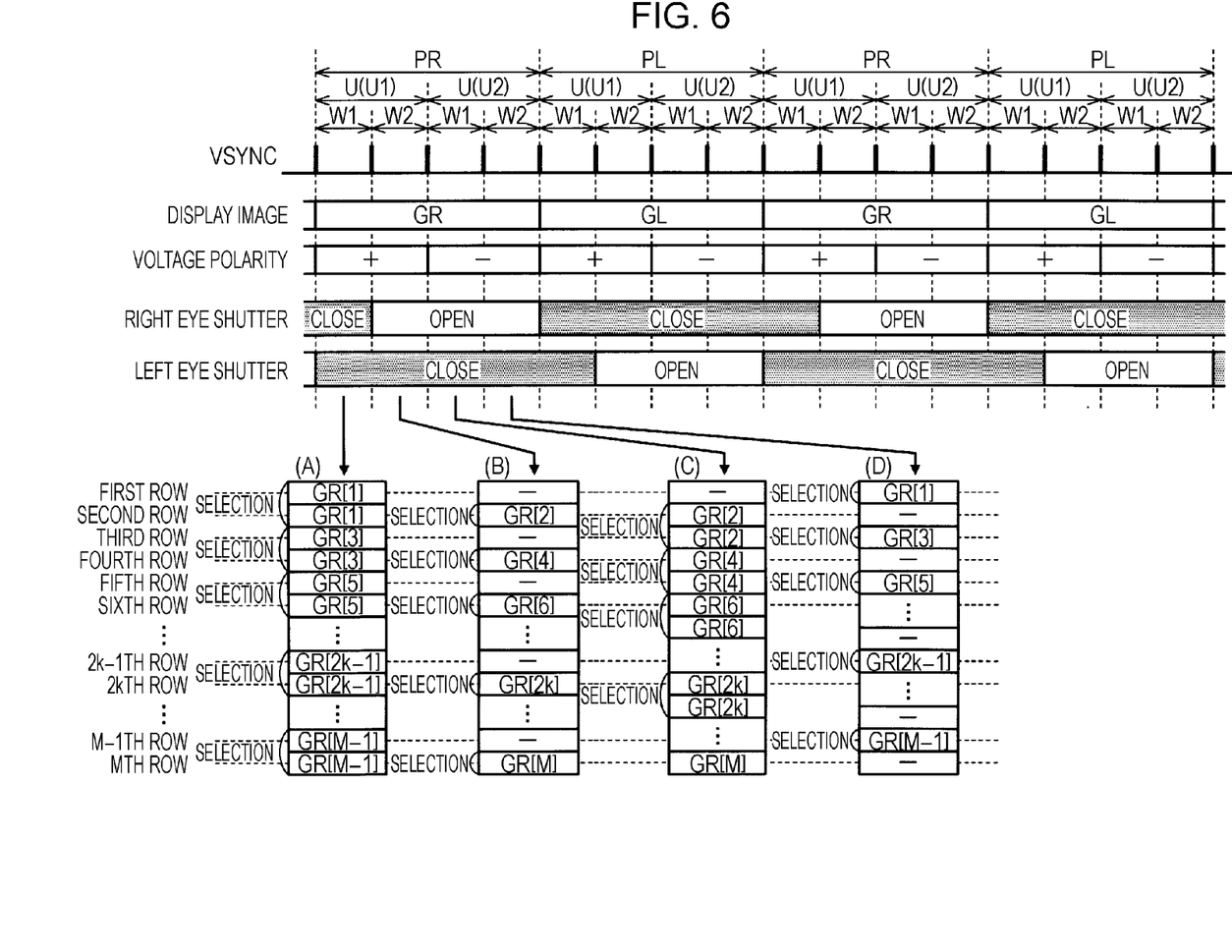
FIG. 6 is an explanatory diagram of an operation of the stereoscopic display device according to the second aspect of the invention.

On the other hand, in a first writing period W1 of a unit period U2 in each of the right eye period PR and left eye period PL, as shown in the reference numeral (C) in FIG. 6, the scanning line driving circuit 42 sequentially selects a combination of a scanning line 32 of a 2kth row and a scanning line 32 of a (2k+1)th row as a selection unit for each selection period H(k). In detail, as shown in FIG. 5, in the kth selection period H(k) in the first writing period W1, a scanning signal Y(2k) of an even numbered row and a scanning signal Y(2k+1) of an odd numbered row are simultaneously set as the selection potential. That is, for example, in a selection period H(1), a scanning line 32 of a second row and a scanning line 32 of a third row are simultaneously selected, and in a selection period H(2), a scanning line 32 of a fourth row and a scanning line 32 of a fifth row are simultaneously selected. In each the selection period H(k) of the first writing period W1 in the unit period U2, a scanning line 32 of a 2kth row is selected as a specified scanning line 32. That is, in each the selection period H(k), a potential VG corresponding to the specified gradation (GR(2k) and GL(2k)) of each pixel which corresponds to the scanning line 32 of the 2kth row (specified scanning line 32) among the right eye image GR and left eye image GL is supplied to each pixel circuit PIX of the selection unit (of two rows).

It is understood in the above description that a combination of two rows of scanning lines 32 configuring each selection unit in the first writing period W1 (that is, a combination of a pixel circuit group B as the supply target of the potential VG) is deviated by one row between the unit period U1 and the unit period U2. However, an operation in which the supply (write) of the potential VG with respect to each pixel circuit PIX is sequentially performed by two lines of the pixel circuit group B at a time for each selection period H(k) is similar in both the unit periods U1 and U2.

In a second writing period W2 of the unit period U2, the potential VG is supplied to each pixel circuit PIX corresponding to a scanning line 32 other than the specified scanning line 32 among each selection units. That is, as shown in the reference numeral (D) in FIG. 6, each scanning line 32 of a (2k−1)th row (a first row, a third row, a fifth row . . . ) is sequentially selected, and a gradation signal X(n) of the potential VG corresponding to the specified gradation (GR (2k−1) and GL(2k−1)) of each pixel which corresponds to the scanning line 32 between the right eye image GR and left eye image GL is supplied to each signal line 34. That is, the scanning lines 32 which are selected in the second writing period W2 (a pixel circuit group B as the supply target of the potential VG) are different from each other in the unit periods U1 and U2.

The same effect as that of the first embodiment may be realized in the second embodiment. Incidentally, there is a difference that the potential VG is supplied only once to each pixel circuit PIX corresponding to the specified scanning line 32 among M scanning lines 32, in each unit period U, and the potential VG is supplied twice to each pixel circuit PIX corresponding to the scanning line 32 other than the specified scanning line 32, in the unit period U. In addition, in each pixel circuit PIX of the specified scanning line 32 and the pixel circuit PIX of the other scanning line 32, a difference in display gradation may occur due to a difference of the supply times of the potential VG (or a supply interval), even if the potential VG which is supplied to each of them is assumed to be equal to each other (that is, a case where the same gradation is specified). In the first embodiment, since each scanning line 32 of odd numbered rows are fixed to the specified scanning line 32, the display gradation of each pixel circuit PIX is different from each other between the odd rows and the even rows (that is, display spots of a row unit occur), even in a case where the entire pixel circuit PIX in the pixel unit 30 is supplied with the same potential VG. On the other hand, in the second embodiment, each scanning line 32 of the odd row is set to the specified scanning line 32 in the unit period U1, and each scanning line 32 of the even row is set to the specified scanning line 32 in the unit period U2. Accordingly, it is advantageous that the difference between the display gradation of each pixel circuit PIX of odd numbered rows and the display gradation the pixel circuit PIX of even numbered rows (display spots) are not easy to be sensed by the viewer.

C: Modified Example

The above described each embodiment can be modified. Detailed modified example will be described in below. Two or more examples which are arbitrarily selected from below may be appropriately combined when they do not conflict with each other.

1. Modified Example 1

The number of scanning lines 32 which are simultaneously selected in a first writing period W1 (the number of scanning lines 32 which constitute a selection unit) are not limited to two which is exemplified above. When the number of the scanning lines 32 which constitutes the selection unit are generalized to H lines, each unit period U is divided into H writing periods of W1 to WH. In addition, in the initial first writing period W1 among each unit period, the selection unit (H scanning lines 32) is sequentially and simultaneously selected in each of K selection periods H(1) to H(k) (K=M/H). In addition, a potential VG corresponding to the specified gradation of each pixel which corresponds to the specified scanning line among a right eye image GR and left eye image GL is supplied to each pixel circuit PIX in the selection unit. Further, in each writing period Wh (h=2 to H) after a second row in the unit period U, one scanning line 32 of hth row in the selection unit is selected, and a potential VG corresponding to the specified gradation of each pixel which corresponds to the scanning line 32 among the right eye image GR and left eye image GL is supplied. The configuration of the second embodiment may be similarly adopted, in which the combination of the scanning line 32 which configures the selection unit is different in each unit period U.

2. Modified Example 2

In the above described each aspect, the right eye shutter 22 was changed from the closed state to the open state at the ending point of the initial first writing period W1 among the right eye periods PR, however, a time in which the right eye shutter 22 is changed to the open state can be appropriately changed. For example, in a configuration in which the right eye shutter 22 is changed to the open state before the ending point of the initial first writing period W1 among the right eye periods PR, the mixed state of the right eye image GR and left eye image GL in the first writing period W1 is slightly sensed by the viewer, however, it is possible to improve the brightness of the display image. On the other hand, in a configuration in which the right eye shutter 22 is changed to the open state after the ending point of the initial first writing period W1 among the right eye periods PR, it is possible to reliably prevent the viewer from sensing the mixed state of the right eye image GR and left eye image GL. That is, the time in which the right eye shutter 22 is changed to the open state is included as a time point in which a predetermined time has passed from the starting point of the initial first writing period W1 among the right eye periods PR (that is, a time necessary to prevent the viewer from sensing the mixed state of the right eye image GR and left eye image GL). The time is appropriately selected according to priority (balance) whether to prevent a user from sensing the mixed state of the right eye image GR and left eye image GL, or to secure the brightness of the display image. The same is applied to a time in which a left eye shutter 24 is changed from the closed state to the open state, and an arbitrary time point in which a predetermined time has passed from the starting point of the initial first writing period W1 among the left eye period PL is appropriately selected according to the priority whether to prevent the user from sensing the mixed state of the right eye image GR and left eye image GL, or to secure the brightness of the display image. In addition, the time for closing and opening in which the user may not sense the mixed state of the right eye image GR and left eye image GL is changed according to a relationship between response characteristics of the right eye shutter 22 and left eye shutter 24 and response characteristics of the electro-optical panel 12 (liquid crystal element CL). Accordingly, it may be a preferable configuration that a time in which each of the right eye shutter 22 and left eye shutter 24 is changed from one side to the other side between the open state and the closed state is selected according to the relationship between response characteristics of the stereoscopic glasses 20 and response characteristics of the electro-optical panel 12.

Similarly, a time in which the right eye shutter 22 is changed from the open state to the closed state is not limited to the ending point of the right eye period PR (the starting point of the left eye period PL). For example, it is possible to change the right eye shutter 22 to the closed state in a predetermined period which includes the ending point of the right eye period PR (before the ending point or after the ending point). For example, a configuration may be adopted in which the left eye shutter 24 is change to the closed state in a predetermined period including the ending point of the left eye period PL (the starting point of the right eye period PR).

3. Modified Example 3

A period which reverses the polarity of the application voltage of the liquid crystal element CL is arbitrary according to the aspect of the invention. For example, a configuration in which the polarity of the application voltage is reversed between the right eye period PR and left eye period PL, or a configuration in which the polarity of the application voltage is reversed by setting a pair of the right eye period PR and left eye period PL as one period may be adopted.

4. Modified Example 4

The number of unit periods U which are included in each of the right eye period PR and left eye period PL is arbitrary. For example, a configuration may be adopted, in which each of the right eye period PR and left eye period PL has three or more unit periods U. However, when considering that the application of the DC component with respect to the liquid crystal element CL can be effectively prevented, on the basis of the configuration in which the polarity of the application voltage of the liquid crystal element CL is reversed for each unit period U, a configuration in which each of the right eye period PR and left eye period PL has even numbers of unit period U may be specially preferable, as described above.

5. Modified Example 5

The electro-optical element is not limited to the liquid crystal element CL. For example, it may be possible to use an electrophoresis element as the electro-optical element. That is, the electro-optical element is included as a display element in which optical characteristics (for example, transmittance) are changed according to an electric operation (for example, application of a voltage).

D: Application Example

Figure 7:
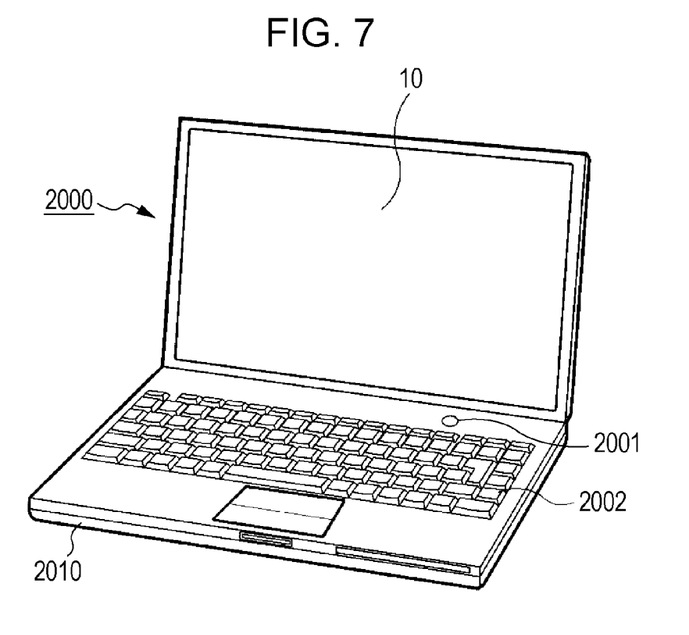
FIG. 7 is a perspective view of an electronic apparatus (a personal computer).
Figure 8:
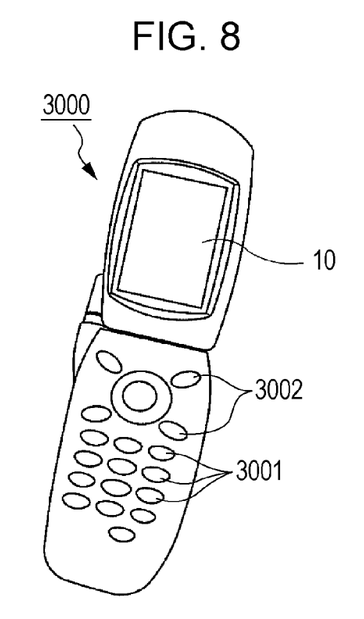
FIG. 8 is a perspective view of an electronic apparatus (a mobile phone).
Figure 9:
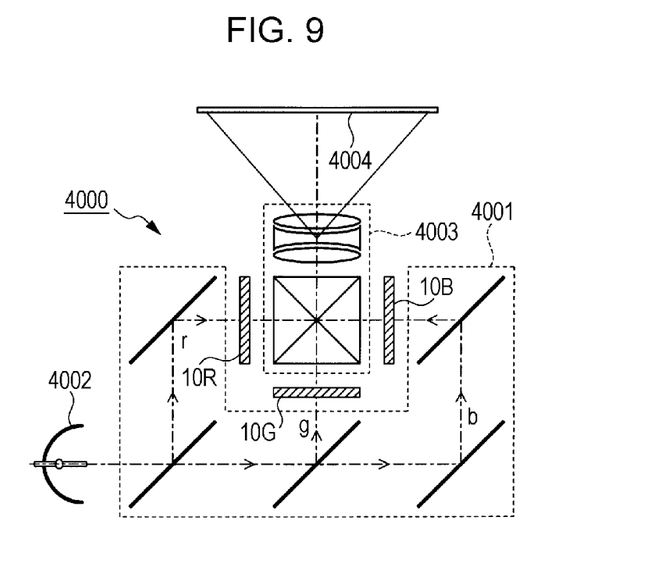
FIG. 9 is a perspective view of an electronic apparatus (a projection-type display device).

The electro-optical device 10 which is exemplified in each of the above described embodiments may be used in various electronic apparatuses. In FIGS. 7 to 9, a specific example of an electronic apparatus is shown, in which the electro-optical device 10 is adopted.

FIG. 7 is a perspective view of a portable personal computer to which the electro-optical device 10 is adopted. A personal computer 2000 includes the electro-optical device 10, and a main body 2010 in which a power switch 2001 or a keyboard 2002 is installed.

FIG. 8 is a perspective view of a mobile phone to which the electro-optical device 10 is adopted. A mobile phone 3000 includes a plurality of operation buttons 3001 and a scroll button 3002, and the electro-optical device 10 which displays various images. By operating the scroll button 3002, a screen which is displayed in the electro-optical device 10 is scrolled.

FIG. 9 is a schematic diagram of a projection-type display device (three-plate projector) 4000 to which the electro-optical device 10 is adopted. The projection-type display device 4000 includes three electro-optical devices (10R, 10G, and 10B) which correspond to display colors (red, green, and blue) which are different from each other. An illumination optical system 4001 supplies a red component r to the electro-optical device 10R among outgoing beams which are output from an illumination device (light source) 4002, supplies a green component g to the electro-optical device 10G, and supplies a blue component b to the electro-optical device 10B. Each of the electro-optical devices 10 functions as an optical modulator (light bulb) which modulates each monochromatic light which is supplied from the illumination optical system 4001, according to the display image. A projection optical system 4003 composes the outgoing beams from each of the electro-optical devices 10, and projects to a projection surface 4004. The viewer can see a stereoscopic image which is projected to the projection surface 4004 through the stereoscopic glasses 20.

In addition, as the electronic apparatus to which the electro-optical device according to the embodiments of the invention is used, a Personal Digital Assistant (PDA), a digital still camera, a television, a video camera, a car navigation system, an automotive display device (instrument panel), an electronic organizer, electronic paper, a calculator, a word-processor, a work station, a video phone, a POS terminal, a printer, a scanner, a copy machine, a video player, an equipment with a touch panel may be exemplified, in addition to the equipments which are shown in FIGS. 7 to 9.

This application claims priority to Japan Patent Application No. 2011-003057 filed Jan. 11, 2011, the entire disclosures of which are hereby incorporated by reference in their entireties.

What is claimed is:

1. An electro-optical device which displays a right eye image in a right eye period and a left eye image in a left eye period following the right eye period, comprising:
   a plurality of scanning lines and a plurality of signal lines which intersect each other;
   a scanning line driving circuit which, in a first writing period of the left eye period and a first writing period of the right eye period, selects two scanning lines of the plurality of scanning lines and, in a second writing period of the left eye period and a second writing period of the right eye period, selects a one scanning line of the two scanning lines the second writing period of the left eye period following the first writing period of the left eye period and the second writing period of the right eye period following the first writing period of the right eye period, the right eye period and the left eye period being alternately set, and the right eye image and the left eye image being parallax; and a signal line driving circuit which supplies a first gradation signal corresponding to a first pixel selected by a other scanning line of the two scanning line in the first writing period of the right eye period, which supplies a second gradation signal corresponding to a second pixel selected by the one scanning line in the second writing period of the right eye period, which supplies a third gradation signal corresponding to the first pixel selected by the other scanning line in the first writing period of the left eye period, and which supplies a fourth gradation signal corresponding to the second pixel selected by the one scanning line in the second writing period of the left eye period.

2. The electro-optical device according to claim 1, further comprising:

a stereoscopic glasses which includes a right eye shutter and a left eye shutter;

a glasses control circuit which puts the left eye shutter and the right eye shutter into a closed state in the first writing period of the right eye period, which puts the left eye shutter into a opened state in the second writing period of the right eye period, which puts the left eye shutter and the right eye shutter into the closed state in the first writing period of the left eye period, and which puts the right eye shutter the opened state in the second writing period of the right eye period.

3. The electro-optical device according to claim 2,
wherein the glasses control circuit changes the right eye shutter from the closed state to the opened state at the ending point of the first writing period among the right eye period, and changes the left eye shutter from the closed state to the open state at the ending point of the first writing period among the left eye periods.

4. The electro-optical device according to claim 1,
wherein the first writing period and the second writing period composes a unit period, the right eye period and the left eye period are include two the unit period, the signal line driving circuit supplies the first and second and third and forth gradation signal have a reverse polarity in each of the unit period neighboring each other, in each of the right eye period and left eye period.

5. The electro-optical device according to claim 4,
wherein each of the right eye period and left eye period includes an even number of unit periods.

6. The electro-optical device according to claim 1,
wherein the scanning line driving circuit sequentially changes a combination of the two scanning line which are selected in the first writing periods of the right eye period and the left eye period.

7. The electro-optical device according to claim 6,
wherein one of the combination of the two scanning line which are selected in the first writing periods of the right eye period and the left eye period and other of the combination of the two scanning line which are selected in the first writing periods of the right eye period and the left eye period in a relationship of being deviated by one row.

8. The electro-optical device according to claim 1,
wherein the scanning line driving circuit selects a combination of the two scanning lines which are neighboring each other as the selection unit.

9. An electronic apparatus, comprising the electro-optical device according to claim 1.

10. An electro-optical device which displays a first image in a first period and a second image in a second period following the first period, comprising:

a plurality of scanning lines and a plurality of signal lines which intersect each other;

a scanning line driving circuit which, in a first writing period of the first period and a first writing period of the second period, selects two scanning lines of the plurality of scanning lines and, in a second writing period of the first period and a second writing period of the second period, selects a one scanning line of the two scanning lines, the second writing period of the first period following the first writing period of the first period and the second writing period of the second period following the first writing period of the second period, the first period and the second period being alternately set; and a signal line driving circuit which supplies a first gradation signal corresponds to a first pixel selected by a other scanning line of the two scanning line in the first writing period of the first period, which supplies a second gradation signal corresponding to a second pixel selected by the one scanning line in the second writing period of the first period, which supplies a third gradation signal corresponds to the first pixel selected by the other scanning line in the first writing period of the second period, and which supplies a fourth gradation signal corresponding to the second pixel selected by the one scanning line in the second writing period of the second period.

* * * * *